United States Patent
Al Qaisi et al.

(10) Patent No.: US 11,102,743 B2
(45) Date of Patent: Aug. 24, 2021

(54) METHOD TO CONFIGURE WIRELESS HART DEVICE USING BLUETOOTH

(71) Applicant: Endress+Hauser SE+Co. KG, Maulburg (DE)

(72) Inventors: Tareq Al Qaisi, Plainfield, IN (US); Gautham Karnik, Whitestown, IN (US)

(73) Assignee: Endress+Hauser SE+Co. KG, Maulburg (DE)

( * ) Notice: Subject to any disclaimer, the term of this patent is extended or adjusted under 35 U.S.C. 154(b) by 154 days.

(21) Appl. No.: 16/696,187

(22) Filed: Nov. 26, 2019

(65) Prior Publication Data

US 2021/0160800 A1 May 27, 2021

(51) Int. Cl.
| | |
|---|---|
| *H04W 84/02* | (2009.01) |
| *H04W 56/00* | (2009.01) |
| *H04W 4/80* | (2018.01) |
| *H04W 12/50* | (2021.01) |
| *H04W 24/00* | (2009.01) |
| *H04W 80/00* | (2009.01) |
| *H04W 84/18* | (2009.01) |

(52) U.S. Cl.
CPC ......... *H04W 56/0015* (2013.01); *H04W 4/80* (2018.02); *H04W 12/50* (2021.01); *H04W 24/00* (2013.01); *H04W 80/00* (2013.01); *H04W 84/18* (2013.01)

(58) Field of Classification Search
CPC ... H04W 56/0015; H04W 4/80; H04W 12/50; H04W 24/00; H04W 80/00; H04W 84/18; H04W 48/18; H04W 88/10; H04W 88/18; H04W 88/06; H04L 69/08; H04L 67/12; H04L 69/18
See application file for complete search history.

(56) References Cited

U.S. PATENT DOCUMENTS

| | | | |
|---|---|---|---|
| 2013/0070745 A1* | 3/2013 | Nixon | H04L 45/74 370/338 |
| 2018/0164767 A1* | 6/2018 | Haase | G05B 19/05 |
| 2019/0293687 A1* | 9/2019 | Nagendran | G01R 15/125 |

* cited by examiner

*Primary Examiner* — Lan-Huong Truong
(74) *Attorney, Agent, or Firm* — Mark A. Logan; Endress+Hauser (USA) Holding Inc.

(57) ABSTRACT

Disclosed is a method of enabling and disabling Bluetooth communication in a WirelessHART field device of process automation technology Also disclosed is a process automation system implementing the inventive method of enabling and disabling Bluetooth communication in a WirelessHART field device.

10 Claims, 5 Drawing Sheets

METHOD TO CONFIGURE WIRELESS HART DEVICE USING BLUETOOTH

TECHNICAL FIELD

The present disclosure relates generally to WirelessHART and Bluetooth communication with process automation field devices.

BACKGROUND

Process automation field devices are discrete devices used in a process automation system for the measurement of some physical phenomena or for the control of some device such as a valve, pump, switch, etc. In a typical embodiment of a field device, the field device includes electronics such as a microcontroller, memory, transducers, and analog-to-digital converters. The field device may include digital and analog outputs, and the field device may include a user interface such as a display screen. A field device will include a housing that encloses and protects the components of the field device.

A process automation field device usually includes a communication interface for communicating with the central controller of the process automation system. This communication interface may be a wired interface such as a 4-20 mA current loop, a HART network, or a digital field bus, or the communication interface may be a wireless interface such as Wi-Fi or WirelessHART.

A field device that connects to a process automation system via WirelessHART may be a battery-powered field device. A battery-powered, WirelessHART field device requires less installation infrastructure in the process automation system because such a field device does not require a wired connection for either power or communication. However, a battery-powered field device's battery will need to be replaced from time to time as the operation of the field device depletes the battery's energy store.

Such a battery-powered, WirelessHART field device connects to the process automation system via a WirelessHART gateway. In the present context, a gateway is generally understood to mean a unit by which two incompatible network systems are connected or coupled. In this case, the WirelessHART gateway couples the network of the process automation system to the WirelessHART network of the field devices. The WirelessHART gateway receives messages from the process automation system and forwards the messages via WirelessHART to the field devices, converting the protocol of the process automation system network to the WirelessHART protocol. The WirelessHART gateway also receives messages via WirelessHART from the field devices and forwards the messages via the process automation system network to the process automation system, converting the WirelessHART protocol to the protocol of the process automation system network.

There is often a need for point-to-point communication with a field device. For example, a technician servicing or calibrating a field device may need access to the field device directly for reading, modifying, and writing the field device's internal parameters. For point-to-point communication, access of the field device via the process automation system's control network (e.g., via WirelessHART) may not be practical or possible. Therefore the process automation field device may include an additional communication interface such as a Bluetooth or Bluetooth Low Energy interface for point-to-point communication.

Both the WirelessHART and the Bluetooth communication protocols use the same 2.5 GHz Industrial, Scientific, Medical (ISM) frequency band. A field device that communicates both in WirelessHART and Bluetooth therefore cannot communicate in both protocols simultaneously because the protocols would interfere with each other. However, the field device may time-slice the two protocols together and communicate alternately in WirelessHART and Bluetooth. This is shown by example in the graph of FIG. 1, interval b, in which WirelessHART communication is periodically every 10 milliseconds (msec) and in which Bluetooth communication is periodically every 10 msec between the WirelessHART periods.

A field device capable of communicating in Bluetooth need not have Bluetooth always enabled if the Bluetooth is used just for point-to-point communication with a field service tool. Indeed, if Bluetooth is continuously enabled in a battery-powered field device such as one communicating in WirelessHART, the field device's battery will unnecessarily run down by communicating in Bluetooth when Bluetooth is not needed. In such battery-powered field devices, it is desirable that the Bluetooth is switched on when needed and switched off when no longer needed.

SUMMARY

Accordingly, there remains a need for further contributions in this area of technology. According to at least one embodiment of the disclosure, a method for servicing a field device of process automation technology is disclosed. The method comprises providing: a process automation system, including a first field device having a WirelessHART communication interface and a Bluetooth communication interface, wherein the first field device is configured to operate each communication interface in a time-sliced manner, wherein the WirelessHART interface is by default enabled, and wherein the Bluetooth communication interface is by default not enabled; a WirelessHART gateway that includes a process automation network interface, a WirelessHART communication interface, and a Bluetooth communication interface, wherein the first field device is in communication with the WirelessHART gateway via WirelessHART; a process automation network; and a central controller including a microprocessor, non-volatile memory, and volatile memory, and further including a process automation network interface, wherein the central controller is in communication with the first WirelessHART gateway via the process automation network, and wherein the central controller includes software for control of the process automation system. The method includes further providing a portable computer having a Bluetooth communication interface. The method includes connecting the portable computer to the WirelessHART gateway via Bluetooth; sending a first command via Bluetooth from the portable computer to the WirelessHART gateway, wherein the first command directs the WirelessHART gateway to enable Bluetooth communication in the first field device; receiving the first command in the WirelessHART gateway, processing the first command in the WirelessHART gateway, and sending a second command via WirelessHART from the WirelessHART gateway to the first field device, wherein the second command directs the first field device to enable its Bluetooth communication interface; receiving the second command in the first field device, processing the second command in the first field device, and enabling Bluetooth communication in the first field device, wherein the Bluetooth communication is time-sliced with the WirelessHART communication such that Bluetooth and WirelessHART are active in alternate time periods; ending the Bluetooth connection between the portable computer and the WirelessHART gateway; making a Bluetooth connection between the portable computer and the first field device; and servicing the first field device via Bluetooth and the portable computer.

In some embodiments of the method, the method further comprises ending the Bluetooth connection between the portable computer and the first field device; making a Bluetooth connection between the portable computer and the WirelessHART gateway; sending a third command via Bluetooth from the portable computer to the WirelessHART gateway, wherein the third command directs the WirelessHART gateway to disable Bluetooth in the first field device; receiving the third command in the WirelessHART gateway, processing the third command in the WirelessHART gateway, and sending a fourth command via WirelessHART from the WirelessHART gateway to the first field device, wherein the fourth command directs the first field device to disable its Bluetooth communication interface; and receiving the fourth command in the first field device, processing the fourth command in the first field device, and disabling Bluetooth communication in the first field device.

In some embodiments of the method, the process automation system further includes a second field device having a WirelessHART communication interface and a Bluetooth communication interface, wherein the second field device is embodied to operate each communication interface in a time-sliced manner, wherein the WirelessHART interface is by default enabled, and wherein the Bluetooth communication interface is by default not enabled, and the sending of the second command via WirelessHART from the WirelessHART gateway includes the sending of the second command to the second field device. In such an embodiment, the method may further comprise receiving the second command in the second field device, processing the second command in the second field device, and enabling Bluetooth communication in the second field device, wherein the Bluetooth communication is time-sliced with the WirelessHART communication such that Bluetooth and WirelessHART are active in alternate time periods.

In some embodiments of the method, the method further comprises ending the Bluetooth connection between the portable computer and the first field device; making a Bluetooth connection between the portable computer and the second field device; and servicing the second field device via Bluetooth and the portable computer.

In some embodiments of the method, the method further comprises ending the Bluetooth connection between the portable computer and the first field device; and disabling Bluetooth communication within the first field device after a period of inactivity of the Bluetooth communication within the first field device.

According to another embodiment of the present disclosure, a method for servicing a field device of process automation technology is disclosed. The method comprises providing a process automation system, including a first field device having a WirelessHART communication interface and a Bluetooth communication interface, wherein the first field device is configured to operate each communication interface in a time-sliced manner, wherein the WirelessHART interface is by default enabled, and wherein the Bluetooth communication interface is by default not enabled; a first WirelessHART gateway that includes a process automation network interface and a WirelessHART communication interface, wherein the first field device is in communication with the first WirelessHART gateway via WirelessHART; a process automation network; a cloud network including a wireless network, wherein the cloud network is connected with the process automation network; and a central controller including a microprocessor, non-volatile memory, and volatile memory, and further including a process automation network interface and an additional network interface, wherein the central controller is connected with the first WirelessHART gateway via the process automation network, wherein the central controller is connected with the cloud network via the additional network interface, and wherein the central controller includes software for control of the process automation system. The method comprises further providing a portable computer having a Bluetooth communication interface and a network interface. The method further comprises: making a network connection between the portable computer and the cloud network; sending a first command via the cloud network from the portable computer to the central controller, wherein the first command directs the central controller to establish a communication channel between first WirelessHART gateway and the portable computer; receiving the first command in the central controller and processing the first command in the central controller, wherein the processing includes establishing a communication channel between the portable computer and the first WirelessHART gateway via the cloud network and the process automation network; sending a list of field devices via the communication channel from the first WirelessHART gateway to the portable computer, wherein the list includes field devices in WirelessHART communication with the first WirelessHART gateway, and wherein the sending of the list of field devices is triggered in the WirelessHART gateway by the establishing of the communication channel; receiving the list of field devices in the portable computer and presenting the list on the portable computer; selecting the first field device from the list of field devices on the portable computer and sending the selection via the communication channel to the first WirelessHART gateway; receiving the selection of the first field device in the first WirelessHART gateway and sending a second command from the first WirelessHART gateway to the first field device via WirelessHART, wherein the second command directs the first field device to enable its Bluetooth communication; receiving the second command in the first field device, processing the second command in the first field device, and enabling Bluetooth communication in the first field device, wherein the Bluetooth communication is time-sliced with the WirelessHART communication such that Bluetooth and WirelessHART are active in alternate time periods; making a Bluetooth connection between the portable computer and the first field device; and servicing the first field device via Bluetooth and the portable computer.

In some embodiments of the method, the process automation system further includes a second field device having a WirelessHART communication interface and a Bluetooth communication interface, wherein the second field device is configured to operate each communication interface in a time-sliced manner, wherein the WirelessHART interface is by default enabled, and wherein the Bluetooth communication interface is by default not enabled, and wherein the second field device is in communication with the first WirelessHART gateway via WirelessHART. In such an embodiment, the method further comprises ending the Bluetooth connection between the portable computer and the first field device; selecting from the list of field devices on the portable computer the second field device and sending the selection via the communication channel to the WirelessHART gateway; receiving the selection of the second field device in the first WirelessHART gateway and sending a second command from the first WirelessHART gateway to the second field device via WirelessHART, wherein the second command directs the second field device to enable its Bluetooth communication; receiving the second command in the second field device, processing the second command in the second field device, and enabling Bluetooth communication in the second field device, wherein the Bluetooth communication is time-sliced with the WirelessHART communication such that Bluetooth and WirelessHART are active in alternate time periods; making a Bluetooth connection between the portable computer and the second field device; and servicing the second field device via Bluetooth and the portable computer.

In certain embodiments of the method, the process automation system further includes a second field device having a WirelessHART communication interface and a Bluetooth communication interface, wherein the second field device is configured to operate each communication interface in a time-sliced manner, wherein the WirelessHART interface is by default enabled, and wherein the Bluetooth communication interface is by default not enabled and a second WirelessHART gateway that includes a process automation network interface and a WirelessHART communication interface, wherein the second field device is in communication with the second WirelessHART gateway via WirelessHART. In such an embodiment of the method, the sending of the first command includes the sending of Global Positioning System (GPS) coordinates of the portable computer to the central controller. In such an embodiment of the method, the method further comprises determining whether the first WirelessHART gateway or the second WirelessHART gateway is closer to the portable computer, wherein the GPS coordinates of the portable computer and GPS coordinates of the first WirelessHART gateway and GPS coordinates of the second WirelessHART gateway are used in the determining of the closer WirelessHART gateway, wherein the central controller establishes the communication channel between the portable computer and the closer of the first and the second WirelessHART gateways.

Also disclosed is a process automation system, comprising: a first field device having a WirelessHART communication interface and a Bluetooth communication interface, wherein the first field device is configured to operate each communication interface in a time-sliced manner, wherein the WirelessHART interface is by default enabled, and wherein the Bluetooth communication interface is by default not enabled; a first WirelessHART gateway that includes a process automation network interface and a WirelessHART communication interface, wherein the first field device is in communication with the first WirelessHART gateway via WirelessHART; a process automation network; a cloud network including a wireless network, wherein the cloud network is connected with the process automation network; and a central controller including a microprocessor, non-volatile memory, and volatile memory, and further including a process automation network interface and an additional network interface, wherein the central controller is connected with the first WirelessHART gateway via the process automation network, wherein the central controller is connected with the cloud network via the additional network interface, and wherein the central controller includes software for control of the process automation system. In the disclosed process automation system, the software of the central controller is configured to: manage a network connection between the cloud network and a portable computer, receive from the portable computer via the cloud network a first command, wherein the first command directs the central controller to establish a communication channel between the portable computer and the first WirelessHART gateway, establish a communication channel between the portable computer and the first WirelessHART gateway via the cloud network and the process automation network, receive a list of field devices from the first WirelessHART gateway and send the list of field devices to the portable computer via the communication channel, wherein the list includes field devices in WirelessHART communication with the first WirelessHART gateway, and receive a selection of a field device from the portable computer, and send the selection to the first WirelessHART gateway via the communication channel. In such a process automation system, the first WirelessHART gateway is configured to receive the selection of a field device from the central controller and to send a second command to the selected field device via WirelessHART, wherein the second command directs the selected field device to enable its Bluetooth communication.

In some embodiments of the disclosed process automation system, the system further comprises: a second field device having a WirelessHART communication interface and a Bluetooth communication interface, wherein the second field device is configured to operate each communication interface in a time-sliced manner, wherein the WirelessHART interface is by default enabled, and wherein the Bluetooth communication interface is by default not enabled; and a second WirelessHART gateway that includes a process automation network interface and a WirelessHART communication interface, wherein the second field device is in communication with the second WirelessHART gateway via WirelessHART, wherein the second WirelessHART gateway is connected with the central controller via the process automation network. In such a process automation system, the software of the central controller is further configured to receive global positioning system (GPS) coordinates of the portable computer from the portable computer, determine whether the portable computer is geographically closer to the first WirelessHART gateway or to the second WirelessHART gateway, based on the GPS coordinates of the portable computer, GPS coordinates of the first WirelessHART gateway, and GPS coordinates of the second WirelessHART gateway, and establish the communication channel between the portable computer and the closer of the first and the second WirelessHART gateways.

DETAILED DESCRIPTION

The present disclosure discloses a method for enabling Bluetooth in a WirelessHART field device in a process automation system. The present disclosure also discloses a process automation system that implements the method of enabling Bluetooth in a field device according to the present disclosure. Various embodiments of the disclosed methods and system will now be presented in conjunction with the figures which illustrate the embodiments. It will be understood that no limitation of the scope of this disclosure is thereby intended.

Figure 2:
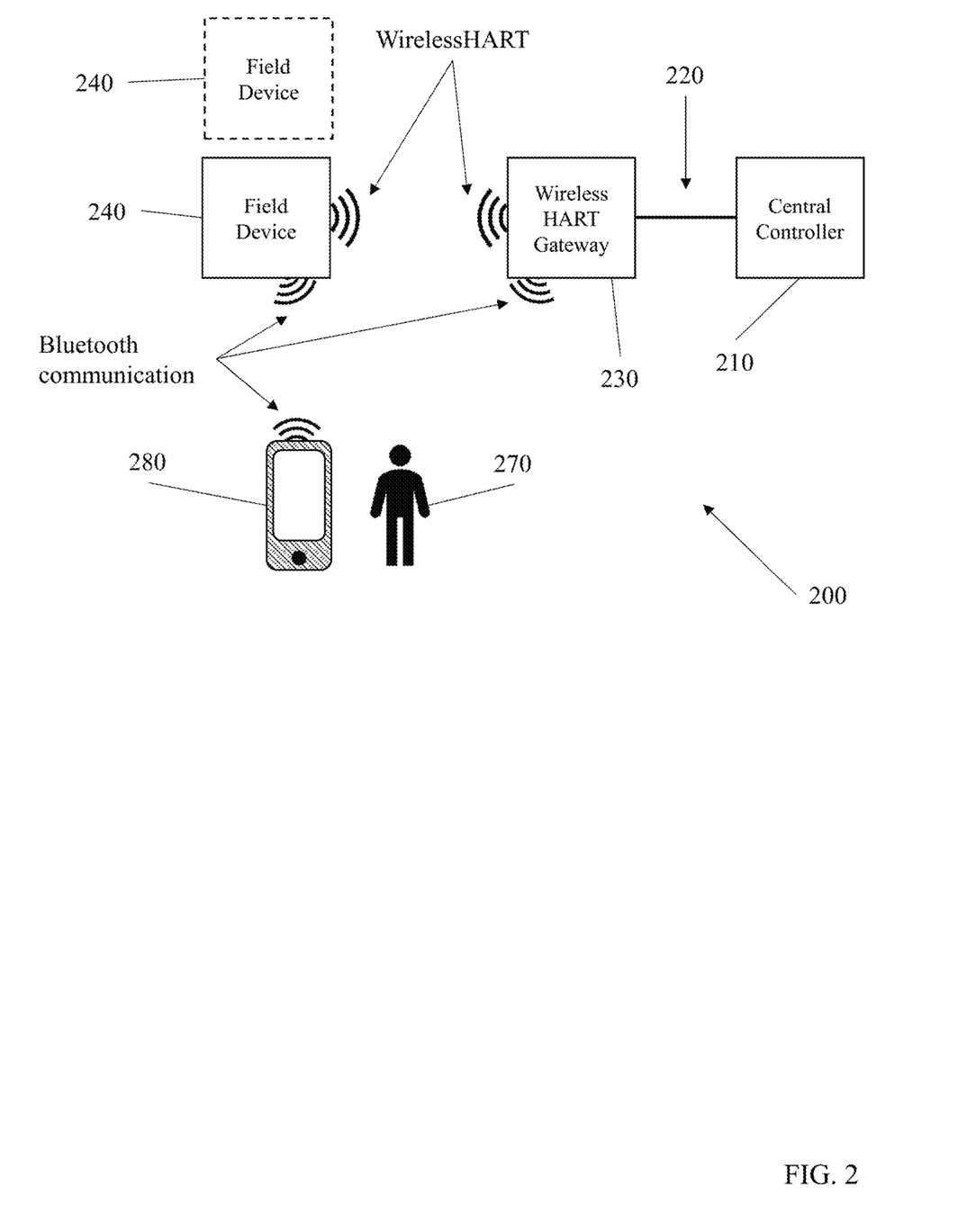
FIG. 2 shows a process automation system according to an embodiment of the present disclosure.

FIG. 2 shows a process automation system 200 according to an embodiment of the present disclosure. The process automation system 200 may include a central controller 210 connected to a process automation network 220. The process automation network 220 may be any suitable process automation network such as Foundation Fieldbus, Profibus, Ethernet, etc. The process automation system 200 may also include a WirelessHART gateway 230 connected to the process automation network 220. The WirelessHART gateway 230 may support the Bluetooth communication protocol in addition to WirelessHART, and the WirelessHART gateway 230 may have both communication protocols enabled by default. The WirelessHART gateway 230 may be in communication with a field device 240 via WirelessHART and may be in communication with the central controller 210 via the process automation network 220.

The field device 240 of the process automation system 200 may support both the WirelessHART communication protocol and the Bluetooth communication protocol. However, by default, only the WirelessHART protocol in the field device 240 is enabled and operating. The Bluetooth protocol within the field device 240 is, by default, not enabled and not operating.

Also shown in FIG. 2 is a service technician 270 with a service tool 280. The service tool 280 may be any portable computing unit (e.g., a mobile smartphone, a tablet, a notebook computer, or a proprietary service tool) that supports the Bluetooth communication protocol. The service tool 280 may support a proprietary software for the servicing of the field device 240. The servicing of the field device 240 by the service technician 270 using the service tool 280 may include the reading of parameters from the field device 240, the changing of parameter values on the field device 240, and the storage of new or additional software on the field device 240.

The servicing of the field device 240 using the service tool 280 may be accomplished using Bluetooth communication. However, as previously noted, Bluetooth communication is not enabled by default on the field device 240. Therefore, before the servicing of the field device 240, the service tool 280 must enable Bluetooth communication in the field device 240.

Figure 3:
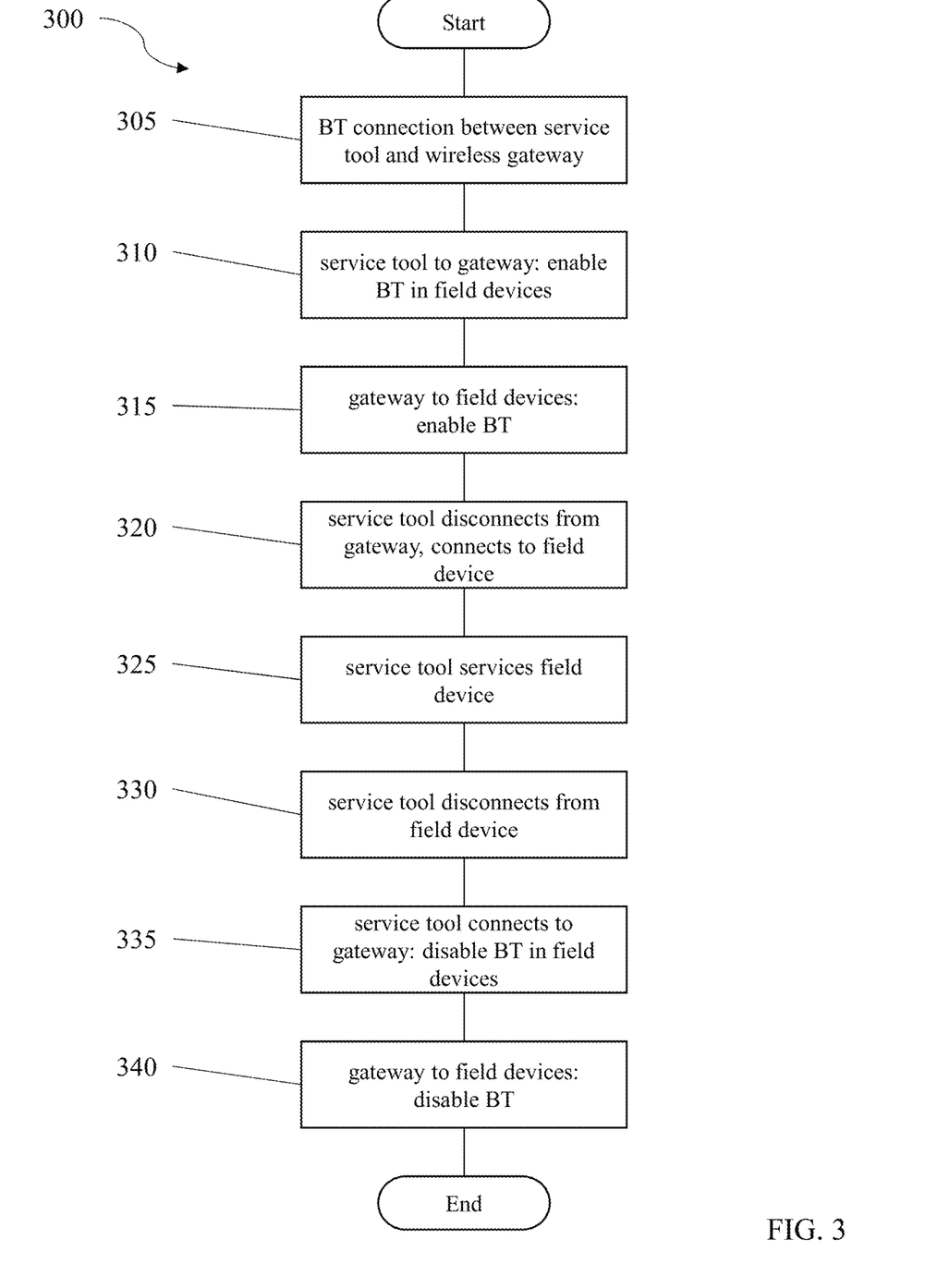
FIG. 3 shows a flowchart of a method according to an embodiment of the present disclosure.

FIG. 3 shows a method 300 of selectively enabling Bluetooth communication on a field device 240 according to the present disclosure. The method 300 may be performed with the process automation system 200 as shown in FIG. 2.

The method 300 may include a step 305 of establishing a Bluetooth connection between the service tool 280 and the WirelessHART gateway 230 that is in WirelessHART communication with the field device 240. To establish the Bluetooth connection, the service technician 270 may enter a command or invoke a menu item or perform a similar action on the service tool 280 to trigger the service tool 280 to establish the Bluetooth connection with the WirelessHART gateway 230. The Bluetooth connection will be a point-to-point connection enabling bi-directional communication via Bluetooth between the service tool 280 and the WirelessHART gateway 230.

The method 300 may include a step 310 of sending a command from the service tool 280 to the WirelessHART gateway 230 via the Bluetooth connection instructing the WirelessHART gateway 230 to send an "enable Bluetooth" command to the field device 240 via WirelessHART. The method step 310 is triggered by an action of the service technician 270 on the service tool 280. The "enable Bluetooth" command from the WirelessHART gateway 230 to the field device 240 will direct the field device 240 to enable its Bluetooth communication.

The method 300 may further include a step 315 in which the WirelessHART gateway 230 sends the "enable Bluetooth" command via WirelessHART to the field device 240 directing the field device 240 to enable its Bluetooth communication. In method step 315 the field device 240 receives the "enable Bluetooth" command via WirelessHART from the WirelessHART gateway 230, and the field device 240 processes the command and enables its Bluetooth communication as a result.

Figure 1:
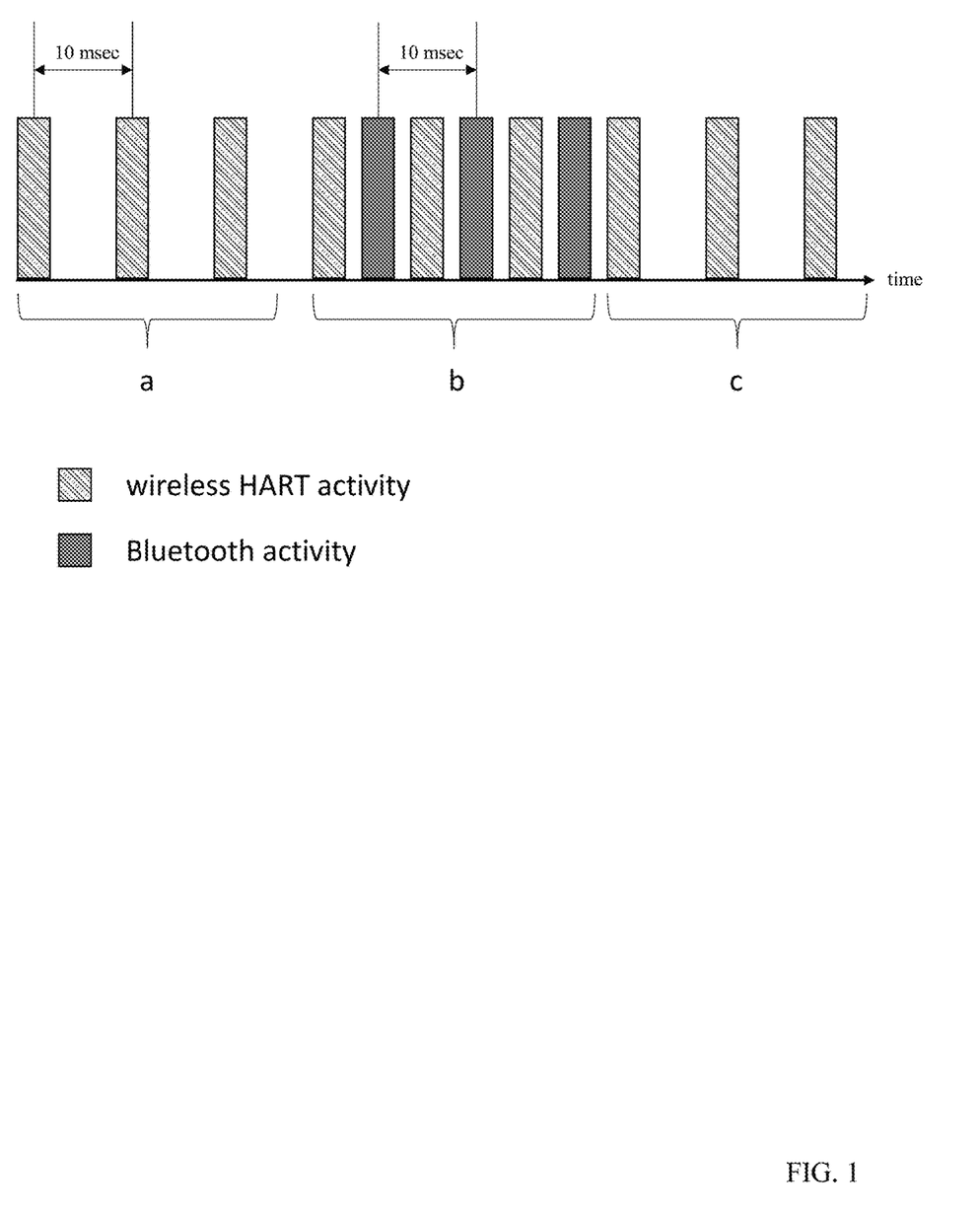
FIG. 1 shows WirelessHART and Bluetooth operating in a time-sliced manner.

Once the field device 240 has enabled its Bluetooth communication, the Bluetooth and WirelessHART communication operate together on the field device 240 in a time-sliced manner as show in the diagram of FIG. 1, interval b. As is shown in FIG. 1, interval b, the enabling of Bluetooth communication in the field device 240 does not affect the transmission of the WirelessHART communication since the two protocols operate in alternating time periods.

Also, once the field device 240 has enabled its Bluetooth communication, the Bluetooth connection between the service tool 280 and the WirelessHART gateway 230 is no longer needed. Therefore, the method 300 may include a step 320 of the service tool 280 ending its Bluetooth connection with the WirelessHART gateway 230 and establishing a Bluetooth connection with the field device 240. The method step 320 is triggered by an action of the service technician 270 on the service tool 280. The Bluetooth connection established between the service tool 280 and the field device 240 will be a point-to-point connection enabling bi-directional communication via Bluetooth between the service tool 280 and the field device 240.

With the Bluetooth connection established between the service tool 280 and the field device 240, the service tool 280 may be used to access the internal parameters of the field device 240. Therefore the method 300 may include a step 325 of the service technician 270 servicing the field device 240 using the service tool 280. The servicing of the field device 240 may include the reading and writing of the parameters of the field device 240 and the performing of diagnostic procedures and may further include the storing of new and additional software modules on the field device 240.

After the servicing of the field device 240 in step 325, the method 300 may include step 330 of the service tool 280 ending its Bluetooth connection with the field device 240. The method step 330 is triggered by an action of the service technician 270 on the service tool 280. Once the Bluetooth connection between the service tool 280 and the field device 240 has ended, the field device 240 may automatically disable its Bluetooth functionality. Alternately, the field device 240 may leave its Bluetooth functionality enabled for a subsequent connection by the service tool 280. In an embodiment of the method 300, if the field device 240 leaves its Bluetooth communication enabled after step 330, the field device 240 may disable its Bluetooth communication after a pre-determined period of inactivity so that the field device 240 then afterward communicates only in WirelessHART as shown in FIG. 1, interval c.

The method 300 may include a step 335 of the service tool 280 reconnecting to the WirelessHART gateway 230 and sending a command via Bluetooth to the WirelessHART gateway 230 instructing the WirelessHART gateway 230 to send a "disable Bluetooth" command via WirelessHART to the field device 240. The "disable Bluetooth" command from the WirelessHART gateway 230 to the field device 240 will direct the field device 240 to disable its Bluetooth communication.

The method 300 may include a step 340 of the WirelessHART gateway 230 sending the "disable Bluetooth" command via WirelessHART to the field device 240 directing the field device 240 to disable its Bluetooth communication. The method step 340 may include the field device 240 receiving the "disable Bluetooth" command from the WirelessHART gateway 230 via WirelessHART and the field device 240 disabling its Bluetooth communication as a result.

The "disable Bluetooth" command sent by the WirelessHART gateway 230 to the field device 240 may be used when the process automation system 200 includes more than one field device 240 to ensure that all field devices 240 in the process automation system disable their Bluetooth when the servicing of the field devices 240 has been completed.

Whether the field device 240 disabled its Bluetooth communication immediately after disconnecting from the service tool 280, or whether the field device 240 disabled its Bluetooth communication after the pre-determined period of inactivity, or whether the field device 240 disabled its Bluetooth after receiving and processing the "disable Bluetooth" command, the field device 240 afterward then communicates using only WirelessHART as shown in FIG. 1, interval c.

In at least one embodiment of the present disclosure, the process automation system 200 may include more than one field device 240 (as shown in phantom in FIG. 2). In such an embodiment of the process automation system 200, the method step 315 then includes the sending of the "enable Bluetooth" command by the WirelessHART gateway 230 via WirelessHART to all of the field devices 240 that are in WirelessHART communication with the WirelessHART gateway 230. Additionally, all of the field devices 240 that receive the "enable Bluetooth" command and that are capable of both WirelessHART and Bluetooth communication will process the command and enable their Bluetooth communication in the method step 315.

In such an embodiment of the process automation system 200 having more than one field device 240, the service technician 270 may in step 320 of the method 300 choose a first field device 240 that has enabled its Bluetooth communication. The service technician 270 may service the first field device 240 in method step 325, and after the servicing disconnect from the first field device 240 in method step 330. The service technician 270 thereafter may return to step 320 of the method and make a Bluetooth connection to a second field device 240 that has enabled its Bluetooth communication. The service technician 270 may thus service all of the field devices 240 in this manner. Enabling Bluetooth in all of the field devices 240 of process automation system 200 in method step 315 makes the servicing of the field devices 240 easier because the service technician 270 need not go back to the WirelessHART gateway 230 each time to enable Bluetooth for each individual field device 240.

Also, in such process automation system 200 having more than one field device 240, the "disable Bluetooth" command sent by the WirelessHART gateway in method step 340 is sent to all of the field devices 240 in WirelessHART communication with the WirelessHART gateway 230. All field devices 240 receiving the command will then return to communicating only in WirelessHART as shown in FIG. 1, interval c.

Figure 4:
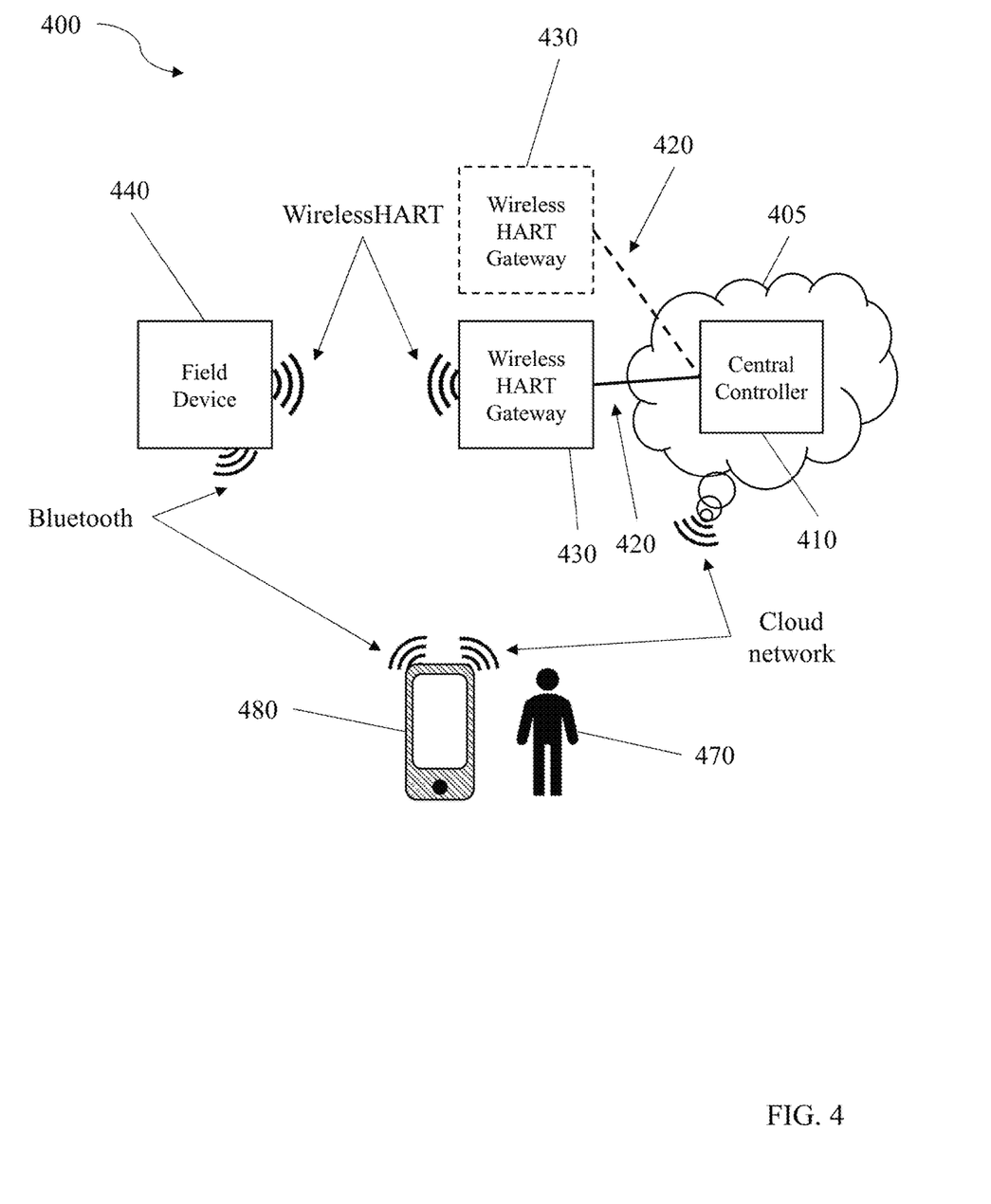
FIG. 4 shows a second process automation system according to an embodiment of the present disclosure.

FIG. 4 shows a process automation system 400 according to an embodiment of the present disclosure. The process automation system 400 may include a WirelessHART gateway 430 connected to a process automation network 420. The process automation network 420 may be any suitable process automation network such as Foundation Fieldbus, Profibus, Ethernet, etc. The process automation system 400 may also include a cloud 405 which includes a central controller 410 and any number of devices, controllers, and communication networks to be used in the process automation system 400.

Whether the WirelessHART gateway 430 supports Bluetooth communication is not relevant in this embodiment of the disclosed process automation system because the service technician connects to the WirelessHART gateway via the cloud 405 and not via Bluetooth.

The central controller 410 may be a programmable logic controller (PLC) or similar computing device that includes a process automation network interface and an additional network interface. The central controller 410 may include a processor and transient as well as non-volatile memory for the storage and execution of software algorithms. The central controller 410 is embodied to manage and control the process automation system 400.

The process automation system 400 may include a field device 440. The field device 440 may support both the WirelessHART communication protocol and the Bluetooth communication protocol. However, by default, only the WirelessHART protocol in the field device 440 is enabled and operating. The Bluetooth protocol within the field device 440 is, by default, not enabled and not operating.

Also shown in FIG. 4 is a service technician 470 with a service tool 480. Service tool 480 may be any portable computing unit (e.g., a mobile smartphone, a tablet, a notebook computer, or a proprietary service tool) that supports the Bluetooth communication protocol. The service tool 480 may additionally support a proprietary software for servicing the field device 440. The servicing of the field device 440 by the service technician 470 using the service tool 480 may include the reading of parameters from the field device 440, the changing of parameter values on the field device 440, and the storage of new or additional software on the field device 440.

The servicing of the field device 440 using the service tool 480 may be accomplished using Bluetooth communication. However, as previously noted, Bluetooth communication is disabled by default on the field device 440. Therefore, before the servicing of the field device 440, the service tool 480 must enable Bluetooth communication in the field device 440.

Figure 5:
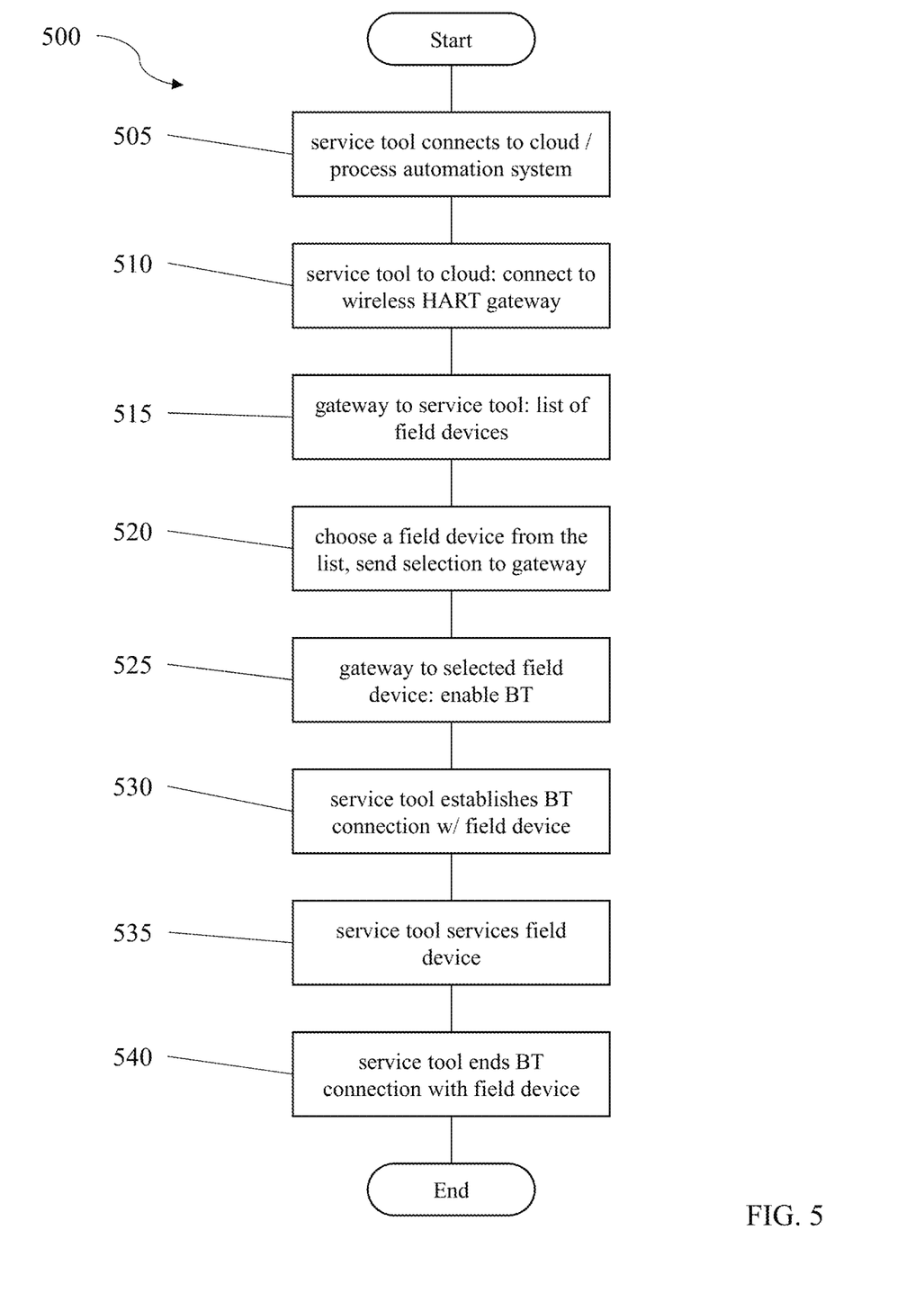
FIG. 5 shows a flowchart of a method according to an embodiment of the present disclosure.

FIG. 5 shows a method 500 of enabling Bluetooth communication on the field device 440 according to the present disclosure. The method 500 may be practiced with the process automation system 400 as shown in FIG. 4.

The method 500 may include a step 505 of establishing communication between the service tool 480 and the cloud 405. To establish the communication, the service technician 470 may enter a command or invoke a menu item or perform a similar action on the service tool 480 to trigger the service tool 480 to establish the communication with the cloud 405. The communication between the service tool 480 and the cloud 405 allows the service tool 480 to communicate with the central controller 410 that is a part of the cloud 405. Though as shown in FIG. 4 the connection between the service tool 480 and the cloud 405 is a wireless connection, the communication may be via any suitable network such as Wi-Fi, cellular, wired Ethernet, etc.

The method 500 may include a step 510 of establishing a communication path between the service tool 480 and the WirelessHART gateway 430. The method step 510 is triggered by an action of the service technician 470 on the service tool 480. In method step 510 a command to establish the communication path is sent from the service tool 480 via the cloud 405 to the central controller 410. The central controller 410 processes the command and routes the command to the WirelessHART gateway 430. The WirelessHART gateway 430 receives and processes the command, and a communication path between the service tool 480 and the WirelessHART gateway 430 is thus established.

The method 500 may include a step 515 of the WirelessHART gateway 430 responding to the establishment of the communication path with the service tool 480 by returning to the service tool 480 via the communication path a list of Bluetooth-capable field devices 440 in WirelessHART communication with the WirelessHART gateway 430. Though FIG. 4 shows only one field device 440, the method 500 contemplates that a plurality of field devices 440 may be connected with the WirelessHART gateway 430 via WirelessHART.

The method 500 may include a step 520 of the service tool 480 receiving the list of Bluetooth-capable field devices 440 from the WirelessHART gateway 430 and presenting the list of field devices 440 to the service technician 470. The method step 520 includes the service technician 470 selecting one field device 440 from the list of field devices 440. The selection is made by the service technician 470 interacting with the list of field devices 440 on the service tool 480. The selected field device 440 will be the device the service technician 470 wishes to service. In method step 520, the selection of the field device 440 is sent from the service tool 480 back to the WirelessHART gateway 430 via the communication channel established between the service tool 480 and the WirelessHART gateway 430.

The method 500 may include a step 525 of the WirelessHART gateway 430 receiving the selection of the field device 440 from the service tool 480. In method step 525, when the WirelessHART gateway 430 receives the selection of the field device 440, the WirelessHART gateway 430 sends an "enable Bluetooth" message via WirelessHART to the selected field device 440. In method step 525 the selected field device 440 receives the "enable Bluetooth" command via WirelessHART from the WirelessHART gateway 430, and the selected field device 440 processes the command and enables its Bluetooth communication as a result.

Once the selected field device 440 has enabled its Bluetooth communication, the Bluetooth and WirelessHART communication operate together on the selected field device 440 in a time-sliced manner as show in the diagram of FIG. 1, interval b. As is shown in FIG. 1, interval b, the enabling of Bluetooth communication in the selected field device 440 does not affect the transmission of the WirelessHART communication since the two protocols operate in alternating time periods.

The method 500 may include a step 530 of the service tool 480 establishing a Bluetooth connection with the selected field device 440. The Bluetooth connection between the service tool 480 and the selected field device 440 is a point-to-point connection enabling bi-directional communication via Bluetooth between the service tool 480 and the selected field device 440.

With the Bluetooth connection in place between the service tool 480 and the selected field device 440, the service tool 480 may have access to the internal parameters of the selected field device 440. Therefore the method 500 may include a step 535 of the service technician 470 servicing the selected field device 440 using the service tool 480. The servicing of the selected field device 440 may include the reading and writing of the parameters of the selected field device 440 and the performing of diagnostic procedures and may further include the storing of new and additional software modules on the selected field device 440.

After the servicing of the field device 440 in step 535, the method 500 may include step 540 of the service tool 480 ending its Bluetooth connection with the selected field device 440. The method step 540 is triggered by an action of the service technician 470 on the service tool 480. Once the Bluetooth connection between the service tool 480 and the selected field device 440 has ended, the selected field device 440 may automatically disable its Bluetooth functionality. Alternately, the selected field device 440 may leave its Bluetooth functionality enabled for a subsequent connection by the service tool 480. In an embodiment of the method 500, if the selected field device 440 leaves its Bluetooth communication enabled after step 540, the selected field device 440 may disable its Bluetooth communication after a pre-determined period of inactivity so that the selected field device 440 then afterward communicates only in WirelessHART as shown in FIG. 1, interval c.

After the servicing of the selected field device 440 with the service tool 480, the service technician 470 may wish to service a different field device 440. To do so, the service technician 470 selects a different field device 440 from the list of field devices 440 on the service tool 480 sent by the WirelessHART gateway 430 in method step 515. In response to the new selection, the following method steps may be repeated for the newly selected field device: step 525 (enabling Bluetooth in the newly selected field device 440); step 530 (connecting the service tool 480 to the newly selected field device 440); step 535 (servicing the newly selected field device); and step 540 (ending the Bluetooth connection between the service tool 480 and the newly selected field device 440). Each field device 440 in the list of field devices 440 may be serviced in a similar manner.

If in an embodiment of the process automation system 400 there is more than one WirelessHART gateway 430 (shown in phantom in FIG. 4), the method 500 may be modified to accommodate the selection of the WirelessHART gateway 430 that is geographically nearest to the service tool 480. The method 500 selects the WirelessHART gateway nearest the service tool 480 because the method 500 assumes the service technician 470 and the service tool 480 are near, or at least within Bluetooth range of, the field devices 440 to be serviced. Therefore, the method assumes that the WirelessHART gateway 430 nearest the service tool 480 is that WirelessHART gateway 430 in WirelessHART communication with the field devices 440 to be serviced.

To support the selection of the WirelessHART gateway 430 nearest the service tool 480, the method step 510 of establishing a communication path between the service tool 480 and the WirelessHART gateway 430 may be modified to include the sending of the geographic location (i.e., Global Positioning System (GPS) coordinates) of the service tool 480 to the central controller 410 via the cloud 405. Using the GPS coordinates of the service tool 480 along with the GPS coordinates of all WirelessHART gateways 430 in the process automation system 400, the central controller 410 determines the WirelessHART gateway 430 having a location geographically closest to the service tool 480. The central controller 410 then establishes a communication path between the service tool 480 and the WirelessHART gateway 430 that is determined to be the closest to the service tool 480.

The remaining steps of method 500 may be unchanged for a process automation system 400 that includes more than one WirelessHART gateway 430: sending a list of Bluetooth-capable field devices 440 to the service tool 480 (step 515); receiving the list in the service tool 480 and selecting a field device 440 (step 520); enabling Bluetooth communication in the selected field device 440 (step 525); establishing a Bluetooth connection between the service tool 480 and the selected field device 440 (step 530); servicing the selected field device 440 (step 535); and ending the Bluetooth connection with the selected field device 440 (step 540). Each Bluetooth-capable field device 440 in the process automation system 400 may thus be serviced in a similar manner.

In an embodiment of the process automation system 400 that includes more than one WirelessHART gateway 430, the service technician 470 with service tool 480 may move to a different geographical location within the process automation system 400 for the servicing of other Bluetooth-enabled field devices 440. At the new location, the method step 510 will include the sending of the new GPS coordinates of the service tool 480, and the remaining method steps of method 500 may be performed again from the new location within the process automation system for the servicing of the field devices 440.

If in an embodiment of the process automation system 400 that includes more than one WirelessHART gateway 430, two or more WirelessHART gateways 430 are equidistant to the service tool 480, the method step 510 may include sending to the service tool 480 a list of WirelessHART gateways 430 to which the service tool 480 may connect. The user 470 may select therefrom via the service tool 480 that WirelessHART gateway that includes the field devices 440 to be serviced. This selection of the WirelessHART gateway 430 triggers the cloud 405 and the central controller 410 to establish a communication channel between the service tool 480 and the selected WirelessHART gateway 430.

Though the present disclosure finds greatest applicability when the connection between the gateway and the field device is via WirelessHART and the connection between the service tool and the field device is Bluetooth, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible and thus remain within the scope of the present disclosure.

What is claimed is:

1. A method for servicing a field device of process automation technology, the method comprising:
providing a process automation system, including:
a first field device having a WirelessHART communication interface and a Bluetooth communication interface, wherein the first field device is configured to operate each communication interface in a time-sliced manner, wherein the WirelessHART interface is by default enabled, and wherein the Bluetooth communication interface is by default not enabled;
a WirelessHART gateway that includes a process automation network interface, a WirelessHART communication interface, and a Bluetooth communication interface, wherein the first field device is in communication with the WirelessHART gateway via WirelessHART;
a process automation network; and
a central controller including a microprocessor, non-volatile memory, and volatile memory, and further including a process automation network interface, wherein the central controller is in communication with the first WirelessHART gateway via the process automation network, and wherein the central controller includes software for control of the process automation system;
providing a portable computer having a Bluetooth communication interface;
connecting the portable computer to the WirelessHART gateway via Bluetooth;
sending a first command via Bluetooth from the portable computer to the WirelessHART gateway, wherein the first command directs the WirelessHART gateway to enable Bluetooth communication in the first field device;
receiving the first command in the WirelessHART gateway, processing the first command in the WirelessHART gateway, and sending a second command via WirelessHART from the WirelessHART gateway to the first field device, wherein the second command directs the first field device to enable its Bluetooth communication interface;
receiving the second command in the first field device, processing the second command in the first field device, and enabling Bluetooth communication in the first field device, wherein the Bluetooth communication is time-sliced with the WirelessHART communication such that Bluetooth and WirelessHART are active in alternate time periods;
ending the Bluetooth connection between the portable computer and the WirelessHART gateway;
making a Bluetooth connection between the portable computer and the first field device; and
servicing the first field device via Bluetooth and the portable computer.

2. The method of claim 1, further comprising:
ending the Bluetooth connection between the portable computer and the first field device;
making a Bluetooth connection between the portable computer and the WirelessHART gateway;
sending a third command via Bluetooth from the portable computer to the WirelessHART gateway, wherein the third command directs the WirelessHART gateway to disable Bluetooth in the first field device;
receiving the third command in the WirelessHART gateway, processing the third command in the WirelessHART gateway, and sending a fourth command via WirelessHART from the WirelessHART gateway to the first field device, wherein the fourth command directs the first field device to disable its Bluetooth communication interface; and receiving the fourth command in the first field device, processing the fourth command in the first field device, and disabling Bluetooth communication in the first field device.

3. The method of claim 1,
wherein the process automation system further includes a second field device having a WirelessHART communication interface and a Bluetooth communication interface, wherein the second field device is embodied to operate each communication interface in a time-sliced manner, wherein the WirelessHART interface is by default enabled, and wherein the Bluetooth communication interface is by default not enabled,
wherein the sending of the second command via WirelessHART from the WirelessHART gateway includes the sending of the second command to the second field device, the method further comprising:
receiving the second command in the second field device, processing the second command in the second field device, and enabling Bluetooth communication in the second field device, wherein the Bluetooth communication is time-sliced with the WirelessHART communication such that Bluetooth and WirelessHART are active in alternate time periods.

4. The method of claim 3, further comprising:
ending the Bluetooth connection between the portable computer and the first field device;
making a Bluetooth connection between the portable computer and the second field device; and
servicing the second field device via Bluetooth and the portable computer.

5. The method of claim 1, further comprising:
ending the Bluetooth connection between the portable computer and the first field device; and
disabling Bluetooth communication within the first field device after a period of inactivity of the Bluetooth communication within the first field device.

6. A method for servicing a field device of process automation technology, the method comprising:
providing a process automation system, including:
a first field device having a WirelessHART communication interface and a Bluetooth communication interface, wherein the first field device is configured to operate each communication interface in a time-sliced manner, wherein the WirelessHART interface is by default enabled, and wherein the Bluetooth communication interface is by default not enabled;
a first WirelessHART gateway that includes a process automation network interface and a WirelessHART communication interface, wherein the first field device is in communication with the first WirelessHART gateway via WirelessHART;
a process automation network;
a cloud network including a wireless network, wherein the cloud network is connected with the process automation network; and
a central controller including a microprocessor, non-volatile memory, and volatile memory, and further including a process automation network interface and an additional network interface, wherein the central controller is connected with the first WirelessHART gateway via the process automation network, wherein the central controller is connected with the cloud network via the additional network interface, and wherein the central controller includes software for control of the process automation system;

providing a portable computer having a Bluetooth communication interface and a network interface;
making a network connection between the portable computer and the cloud network;
sending a first command via the cloud network from the portable computer to the central controller, wherein the first command directs the central controller to establish a communication channel between first WirelessHART gateway and the portable computer;
receiving the first command in the central controller and processing the first command in the central controller, wherein the processing includes establishing a communication channel between the portable computer and the first WirelessHART gateway via the cloud network and the process automation network;
sending a list of field devices via the communication channel from the first WirelessHART gateway to the portable computer, wherein the list includes field devices in WirelessHART communication with the first WirelessHART gateway, and wherein the sending of the list of field devices is triggered in the WirelessHART gateway by the establishing of the communication channel;
receiving the list of field devices in the portable computer and presenting the list on the portable computer;
selecting the first field device from the list of field devices on the portable computer and sending the selection via the communication channel to the first WirelessHART gateway;
receiving the selection of the first field device in the first WirelessHART gateway and sending a second command from the first WirelessHART gateway to the first field device via WirelessHART, wherein the second command directs the first field device to enable its Bluetooth communication;
receiving the second command in the first field device, processing the second command in the first field device, and enabling Bluetooth communication in the first field device, wherein the Bluetooth communication is time-sliced with the WirelessHART communication such that Bluetooth and WirelessHART are active in alternate time periods;
making a Bluetooth connection between the portable computer and the first field device; and
servicing the first field device via Bluetooth and the portable computer.

7. The method according to claim 6,
wherein the process automation system further includes a second field device having a WirelessHART communication interface and a Bluetooth communication interface, wherein the second field device is configured to operate each communication interface in a time-sliced manner, wherein the WirelessHART interface is by default enabled, and wherein the Bluetooth communication interface is by default not enabled, and wherein the second field device is in communication with the first WirelessHART gateway via WirelessHART,
the method further comprising:
ending the Bluetooth connection between the portable computer and the first field device;
selecting from the list of field devices on the portable computer the second field device and sending the selection via the communication channel to the WirelessHART gateway;
receiving the selection of the second field device in the first WirelessHART gateway and sending a second command from the first WirelessHART gateway to the second field device via WirelessHART, wherein the second command directs the second field device to enable its Bluetooth communication;

receiving the second command in the second field device, processing the second command in the second field device, and enabling Bluetooth communication in the second field device, wherein the Bluetooth communication is time-sliced with the WirelessHART communication such that Bluetooth and WirelessHART are active in alternate time periods;

making a Bluetooth connection between the portable computer and the second field device; and servicing the second field device via Bluetooth and the portable computer.

8. The method of claim 6, wherein the process automation system further includes
a second field device having a WirelessHART communication interface and a Bluetooth communication interface, wherein the second field device is configured to operate each communication interface in a time-sliced manner, wherein the WirelessHART interface is by default enabled, and wherein the Bluetooth communication interface is by default not enabled; and
a second WirelessHART gateway that includes a process automation network interface and a WirelessHART communication interface, wherein the second field device is in communication with the second WirelessHART gateway via WirelessHART, and wherein the sending of the first command includes the sending of Global Positioning System (GPS) coordinates of the portable computer to the central controller, the method further comprising:
determining whether the first WirelessHART gateway or the second WirelessHART gateway is closer to the portable computer, wherein the GPS coordinates of the portable computer and GPS coordinates of the first WirelessHART gateway and GPS coordinates of the second WirelessHART gateway are used in the determining of the closer WirelessHART gateway,
wherein the central controller establishes the communication channel between the portable computer and the closer of the first and the second WirelessHART gateways.

9. A process automation system, comprising:
a first field device having a WirelessHART communication interface and a Bluetooth communication interface, wherein the first field device is configured to operate each communication interface in a time-sliced manner, wherein the WirelessHART interface is by default enabled, and wherein the Bluetooth communication interface is by default not enabled;
a first WirelessHART gateway that includes a process automation network interface and a WirelessHART communication interface, wherein the first field device is in communication with the first WirelessHART gateway via WirelessHART;
a process automation network;
a cloud network including a wireless network, wherein the cloud network is connected with the process automation network; and
a central controller including a microprocessor, non-volatile memory, and volatile memory, and further including a process automation network interface and an additional network interface, wherein the central controller is connected with the first WirelessHART gateway via the process automation network, wherein the central controller is connected with the cloud network via the additional network interface, and wherein the central controller includes software for control of the process automation system;

wherein the software of the central controller is configured to:
manage a network connection between the cloud network and a portable computer,
receive from the portable computer via the cloud network a first command, wherein the first command directs the central controller to establish a communication channel between the portable computer and the first WirelessHART gateway,
establish a communication channel between the portable computer and the first WirelessHART gateway via the cloud network and the process automation network,
receive a list of field devices from the first WirelessHART gateway and send the list of field devices to the portable computer via the communication channel, wherein the list includes field devices in WirelessHART communication with the first WirelessHART gateway, and
receive a selection of a field device from the portable computer, and send the selection to the first WirelessHART gateway via the communication channel, and wherein the first WirelessHART gateway is configured to receive the selection of a field device from the central controller and to send a second command to the selected field device via WirelessHART, wherein the second command directs the selected field device to enable its Bluetooth communication.

10. The process automation system of claim 9, further comprising:
a second field device having a WirelessHART communication interface and a Bluetooth communication interface, wherein the second field device is configured to operate each communication interface in a time-sliced manner, wherein the WirelessHART interface is by default enabled, and wherein the Bluetooth communication interface is by default not enabled; and
a second WirelessHART gateway that includes a process automation network interface and a WirelessHART communication interface, wherein the second field device is in communication with the second WirelessHART gateway via WirelessHART, wherein the second WirelessHART gateway is connected with the central controller via the process automation network, wherein the software of the central controller is further configured to:
receive global positioning system (GPS) coordinates of the portable computer from the portable computer,
determine whether the portable computer is geographically closer to the first WirelessHART gateway or to the second WirelessHART gateway, based on the GPS coordinates of the portable computer, GPS coordinates of the first WirelessHART gateway, and GPS coordinates of the second WirelessHART gateway, and
establish the communication channel between the portable computer and the closer of the first and the second WirelessHART gateways.

* * * * *